United States Patent Office 3,759,731
Patented Sept. 18, 1973

3,759,731
PIGMENT MIXTURE OF POLAR AND NONPOLAR SYMMETRICAL/ASYMMETRICAL DISAZO DYESTUFFS
Rudolf Kühne, Frankfurt am Main, Heinrich Hamal, Schwalbach, Taunus, Georg Geissler, Frankfurt am Main, Willy Herbst, Hofheim, Taunus, and Joachim Ribka, Offenbach am Main, Germany, assignors to Farbwerke Hoechst Aktiengesellschaft vormals Meister Lucius & Brüning, Frankfurt am Main, Germany
No Drawing. Filed Mar. 12, 1971, Ser. No. 123,817
Claims priority, application Germany, Mar. 14, 1970, P 20 12 152.2
Int. Cl. C08h 17/14
U.S. Cl. 106—288 Q 4 Claims

ABSTRACT OF THE DISCLOSURE

Mixtures of disazo dyestuffs obtained by coupling diazotized 3,3'-dichloro-4,4'-diamino-diphenyl with a mixture consisting of one or two polar coupling components of the acetoacetylamino-benzene and 1 - aryl-pyrazolone - (5) series containing carboxy and/or sulfonic acid groups and another mixture consisting of one or two non polar coupling components of the acetoacetylamino-benzene and 1-aryl-pyrazolone-(5) series without any water-solubilizing groups. These dyestuff mixtures show improved rheological properties and an improved tinctorial strength. Moreover, they yield purer shades and have an increased transparency.

---

The present invention provides pigment mixtures made from disazo dyestuffs and a process for preparing them.

Disazo pigments of the acetoacetic acid arylamide and 1-aryl-pyrazolone-(5) series, for example, coupling products of 1 mol of tetratozized 3,3'-dichloro-4,4'-diaminodiphenyl with 2 mols of 2-acetoacetylamino-anisol or 2 mols of 1-phenyl-3-methyl-pyrazolone-(5), have gained great economic importance as yellow and orange pigments for the graphic arts industry. These pigments are especially distinguished by a high resistance to solvents and a high tinctorial strength that is in relation to a high specific surface or the presence of very small pigment particles. This again brings about a physico-chemical reciprocation of said pigments with the solvents and binders used during the manufacture of the printing inks, in which relatively stable gel structures having correspondingly unfavorable rheological properties are formed. This disadvantage has been disclosed several times in the art, for example by F. M. Smith in "Paint Manufacture," August 1957, page 296; and G. Wormald in "Paint and Varnish Production," April 1957, page 56.

During the past few years, there has been a growing tendency in the graphic arts industry towards the development of high speed printing machines which require, to an increasing extent, printing inks having a high tinctoral strength, a very good flow property and, for mult-colored printing, additionally a high transparency. German Patent No. 1,155,755 discloses that such pigments can be improved in their rheological properties by an after-treatment with organic solvents.

In many cases, however, the requirement for a higher tinctorial strength and a better transparency cannot be met according to the above-mentioned process. In most cases, the improvement in rheological properties achieved by means of the above-mentioned treatment with solvents involves a decrease in transparency which may sometimes be quite appreciable. This means that the pigments treated in such a manner increase the opacity which is not at all desirable in printing inks, especially in those used for multi-colored prints.

The present invention now provides novel mixtures of disazo-dyestuffs consisting of 1 or 2 non-polar symmetrical dyestuffs of the formula

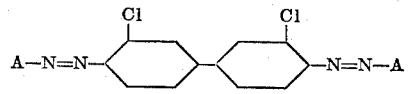

respectively

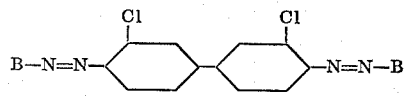

0 or 1 non-polar asymmetrical dyestuff of the formula

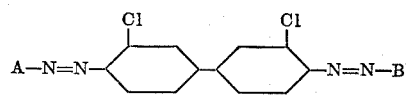

1 or 2 polar symmetrical dyestuffs of the formula

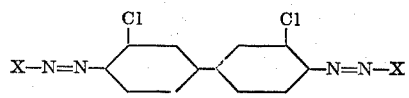

respectively

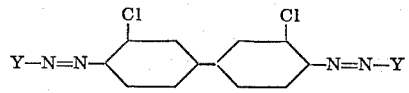

and 1, 2, 3 or 5 polar asymmetrical dyestuffs of the formulae

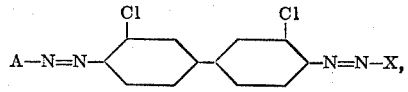

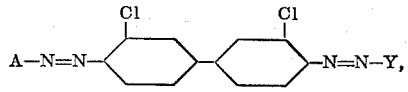

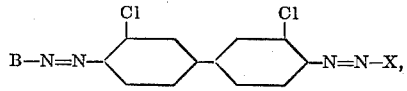

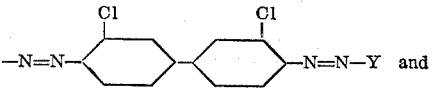

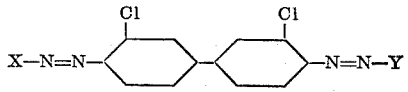

in which A and B represent acetoacetylaminobenzene, which may be substituted by one to three members selected from the group consisting of lower alkyl, lower alkoxy, chlorine and bromine or 1-aryl-pyrazolone-(5), which may be substituted in the 3-position by lower alkyl or lower alkoxy and in the aryl ring by 1 to 3 members from the group of lower alkyl, lower alkoxy, chlorine and bromine, and X and Y represent the same substituents as A and B but which contain additionally 1 or 2 carboxy and/or sulfonic acid groups, with the proviso that A and B respectively X and Y being always different. Such mixtures are obtained by coupling 1 mol of tetrazotized 4,4'-diamino-3,3'-di-chlorodiphenyl with 2 mols of a mixture consisting of (a) 0.5 to 20 mol percent, preferably 1 to 5 mol percent, of the polar coupling component of the formula H—X or H—Y or of a mixture of these two coupling components in a molar ratio of 10:90, preferably 50:50%; and (b) 99.5 to 80 mol percent, preferably 99 to 95 mol percent, of the nonpolar coupling component of the formula H—A or H—B or of a mixture of these two coupling components in a molar ratio of 20:80, preferably 50:50%, whereby A, B, X and Y have the meanings given above.

It is assumed that a more or less substantial part of the polar dyestuffs containing carboxylic acid and/or sulfonic acid groups, hereinafter referred to as additional dyestuff, is absorbed on the surface of the main dyestuff.

As coupling components of the acetoacetic acid arylamide series the following compounds may, for example, be used:

acetoacetylamino-benzene,
2-acetoacetylamino-toluene,
4-acetoacetylamino-toluene,
2-acetoacetylamino-anisol,
4-acetoacetylamino-anisol,
2-acetoacetylamino-phenetol,
4-acetoacetylamino-phenetol,
1-acetoacetylamino-2,4-dimethylbenzene,
1-acetoacetylamino,2,4-dimethoxy-benzene,
1-acetoacetylamino-2,5-dimethoxy-benzene,
1-acetoacetylamino-,2,5-dichloro-benzene,
1-acetoacetylamino-2,5-dimethoxy-4-chloro-benzene,
5-chloro-2-acetoacetylamino-toluene,
3-chloro-4-acetoacetyl-amino-toluene,
1-acetoacetylamino-naphthalene,
2-acetoacetylamino-naphthalene and other acetoacetic acid arylamides of similar constitution.

Examples of coupling components of the pyrazolone series are the following: 1-phenyl-3-methyl - pyrazolone-(5), 1-(p-tolyl) - 3 - methyl-pyrazolone-(5), 1-phenyl-3-ethoxycarbonyl-pyrazolone-(5), and other 1-aryl-pyrazolones-(5) which may carry, in the phenyl nucleus, another or several other substituents, for example halogen atoms, methyl or alkoxy groups, or the aryl nucleus of which is derived from 1-amino-naphthalene or from 2-amino-naphthalene or which have a comparative constitution.

As suitable polar coupling components of the acetoacetic acid aryl-amide series, the following may, for example, be mentioned:

2-acetoacetylamino-benzoic acid,
3-acetoacetylamino-benzoic acid,
4-acetoacetylamino-benzoic acid,
2-acetoacetylamino-toluene-4-carboxylic acid,
3-acetoacetylamino-toluene-4-carboxylic acid,
2-chloro-4-acetoacetylamino-benzoic acid,
3-chloro-4-acetoacetylamino-benzoic acid,
4-acetoacetylamino-2-hydroxy-benzoic acid,
5-acetoacetylamino-2-hydroxy-benzoic acid,
1-acetoacetylamino-benzene-3,5-dicarboxylic acid,
2-acetoacetylaminobenzene-sulfonic acid,
3-acetoacetylamino-benzene-sulfonic acid,
4-acetoacetylamino-benzene-sulfonic acid,
1-acetoacetylaminonaphthalene-4-sulfonic acid, and other acetoacetic acid arylamides having similar substituents.

As coupling components having polar groups of the pyrazolone series there may, for example, be used the following:

1-(3'-sulfonphenyl)-3-methyl-pyrazolone-(5),
1-(4'-sulfophenyl)-3-methyl-pyrazolone-(5),
1-(4-'-carboxyphenyl)-3-methyl-pyrazolone-(5),
1-(2'-chloro-4'-sulfonphenyl)-3-methyl-pyrazolone-(5),
1-(2',5'-dichloro-4'-sulfophenyl)-3-methyl-pyrazolone-(5),
1-(6'-chloro-2'-methyl-4'-sulfophenyl)-3-methyl-pyrazolone-(5),
1-phenyl-3-carboxy-pyrazolone-(5),
1-(4'-sulfophenyl)-3-carboxy-pyrazolone-(5), and other pyrazolones having similar substituents.

The dyestuffs are prepared by coupling according to known methods, preferably in an aqueous medium, and it may be suitable to add a wetting or dispersing agent selected from the group of non-ionic, cationic or anionic surfactants. In some cases, it may also be advantageous to couple in the presence of organic solvents, for example pyridine, dimethylformamide, dimethyl-sulfoxide, dioxan or tetrahydrofuran. To improve the particle quality of the pigment it is, in many cases, advantageous to subject the pigment suspension obtained to a thermal aftertreatment, for example to heat it to elevated temperatures or boil it for some time. The effect of the thermal aftertreatment may still be accelerated or increased by adding small amounts of organic solvents, such as pyridine, halogeno-benzenes, halogeno-naphthalenes or phthalic acid alkyl esters.

The polar additional coupling component may be added prior to or during coupling; also several of these additional components may be employed, for example one of these may be added prior to coupling whereas the second one is introduced in the form of a solution at the same time as the tetrazonium salt solution but separately from this.

Although the use of the two coupling components, i.e. a main component and an additional one, is the preferable embodiment of this process, it may in some cases be advantageous to modify this mode of operation so as to react the tetrazonium salt solution with a mixture of two or three main components and at least one of the said additional components.

The pigments obtained according to the new process may, moreover, be blended in the coupling liquor or in the press cake according to usual methods, for example, with metal salts of higher fatty acids, metal resinates or the free saturated or unsaturated fatty acids themselves, but also with free resinic acids as obtained by precipitation of alkali metal resinates in acids. Furthermore, mineral oils, fat oils or fats may also be incorporated in substance or in an emulsified form.

Compared with corresponding pigments prepared without an addition of polar coupling components, the pigment mixtures of the invention are especially distinguished by substantially better rheological properties and a very substantially improved tinctorial strength. Moreover, in most cases, the modified pigments yield purer shades having a greenish tint which is very desirable especially with certain yellow pigments. An increased transparency of the prints produced with the modified pigments can also be observed. Pigments that tend to recrystallization when being dispersed in binders containing solvents or upon storage of the corresponding paints or inks, for example the coupling product of 1 mol of tetrazotized 3,3'-dichloro-4,4'-diamino-diphenyl with 2 mols of 2-acetoacetylamino-toluene, are substantially improved according to the present invention as far as their stability on storage is concerned.

The tinctorial strength is evaluated by a visual comparison of dyeings of zinc oxide-linseed oil pastes. For this purpose, the pigment and a comparative dyestuff are ground with a standardized white pigment consisting of zinc oxide at a ratio of 1:20 (in some cases, preferably of 1:80) and with the necessary amount of linseed oil that is equal in both cases in a usual dish grinding machine at 3× 100 r.p.m. The colored pastes obtained are applied to a glass plate in such a manner that the two samples to be compared are in direct contact. Evaluation is made from the back side of the glass plate. Further pastes are then prepared by gradually varying the amount of the pigment to be tested in order to determine the pigment amount which has the same tinctorial strength as 100 parts of the comparative pigment. This method furthermore permits a very good comparison of the shade and the purity of shade. The data on tinctorial strength, shade and purity given in the examples refer to this testing method unless stated otherwise.

The rheological properties are tested in a commercial intaglio printing varnish on the basis of phenol resin/toluene having a solids content of 50%. The printing ink consisting of 15% of pigment, 20% of toluene and 65% of the said varnish is ground and mixed for 15 minutes in an attritor operating at 400 r.p.m. and having a grinding body diameter of 3 mm. 24 hours after the grinding operation has been terminated, the flow diagram is taken in a recording structure-viscosimeter. The flow values hereinafter indicated are calculated from the flow diagram with the assumption of a Bingham body for the printing ink. In the case of inks and varnishes having approximately the same specific weight, they prove directly proportional to the outflow time from a DIN-beaker (cf. DIN (German Industrial Standards) No. 53211); large numbers of the flow value correspond to long outflow times. The flow values given in the examples refer to this method.

For the evaluation of transparency, the printing ink is printed on a black bottom and the print is compared with a print produced with the comparative pigment.

The use of the modified pigments of the invention is, however, not at all limited to the field of graphic printing. The novel pigments may successfully be used also in varnishes, for example in air-drying varnishes on the basis of oil-modified alkyd resins, owing to their high tinctorial strength, especially in those cases which additionally require a high transparency. Some of the novel pigments may advantageously also be employed for the coloration of plastic masses, for example plasticized polyvinyl chloride.

Since, in many cases, the technological properties of a pigment depend to a large extent on the coupling method applied, the modified pigments were compared in the examples with pigments prepared according to the same method but without polar additional components. The parts and percentages are by weight unless stated otherwise.

EXAMPLE 1

Tetrazonium salt solution 25.3 parts of 3,3'-dichloro-4,4'-diamino-diphenyl were stirred with 100 parts by volume of 5 N hydrochloric acid for several hours at room temperature, 150 parts of ice where then added and the mixture was tetrazotized in usual manner with 40.5 parts by volume of 5 N sodium nitrite solution at a temperature between 0 and +5° C. After clarification of the tetrazonium salt solution obtained, the excess nitrite was eliminated by means of an adequate amount of amidosulfonic acid.

Coupling suspension 34.02 parts of acetoacetyl-aminobenzene as the main component and 1.90 parts of 2-acetoacetyl-amino-toluene-4-carboxylic acid as the additional component were stirred in 800 parts by volume of water and the mixture was dissolved by adding 28 parts by volume of a 33% aqueous sodium hydroxide solution. The alkaline solution obtained was precipitated while rapidly stirring by means of about 20 parts by volume of glacial acetic acid and the pH was adjusted to 5.5. The two coupling components were in a ratio of 96:4 mol percent.

Coupling took place within 90 minutes at a temperature of 20° C., the tetrazonium salt solution being introduced beneath the surface of the intensely stirred coupling suspension in such a manner that there was never an excess of tetrazonium salt solution in the coupling liquor. After about ⅔ of the total amount of tetrazo solution had been consumed, another 50 parts by volume of 4 N sodium acetate solution were added to the coupling suspension. Immediately after coupling the pigment suspension obtained was heated to 90° C. by feeding in steam within 90 minutes, and stirring was then continued for 30 minutes at this temperature. The whole was cooled to 60–70° C. by adding cold water, suction-filtered and washed with a large amount of water on the filter. The product was dried at 50–60° C. in a drying cabinet with circulating air. After grinding a yellow pigment was obtained.

Comparative dyestuff 1

A comparative dyestuff was prepared according to the same process except that as the coupling component only acetoacetylaminobenzene was used in an equivalent amount of 35.44 parts.

At a ratio of color pigment to white pigment of 1:80, 75 parts of the modified pigment dyed a zinc oxide-linseed oil paste to the same degree as 100 parts of the comparative dyestuff 1 did. An intaglio printing ink based on toluene and produced with the modified pigment showed a flow value of 2,280 whereas the printing ink produced from the comparative dyestuff 1 had the flow vaue of 9,900.

EXAMPLE 2

Coupling was performed as in Example 1 except that, instead of the additional component mentioned in Example 1, 2.12 parts of 1-acetoacetylaminobenzene-3,5-dicarboxylic acid were used. The main component and the additive were in a ratio of 96:4 mol percent.

At a ratio of color pigment to white pigment of 1:80, 80 parts of the modified pigment dyed a zinc oxide-linseed oil paste to the same degree as 100 parts of the comparative dyestuff 1 did. A toluene-intaglio printing ink produced with and containing 15% of the modified pigment had a flow value of 2,100.

EXAMPLE 3

Coupling was performed as in Example 1 except that, instead of the additional component mentioned in Example 1, 1.90 parts of 4-acetoacetylamino-phenyl-acetic acid were used. Main component and additional component were in a ratio of 96:4 mol percent.

In a tinctorial strength test on a zinc oxide-linseed oil paste at a ratio of color pigment to white pigment of 1:80, 70 parts of the modified pigment showed the same tinctorial strength as 100 parts of the comparative dyestuff 1.

EXAMPLE 4

Coupling was performed as in Example 1 except that, instead of the additional component mentioned in Example 1, 1.90 parts of 3 - acetoacetylamino-toluene-4-carboylic acid were used. Main component and additional component were in a ratio of 96:4 mole percent.

At a ratio of color pigment to white pigment of 1:80, 75 parts of this modified pigment dyed a zinc oxide-linseed oil paste to the same degree as 100 parts of the comparative dyestuff 1 did.

EXAMPLE 5

Coupling was performed as in Example 1 except that, instead of the additional component mentioned in Example 1, 1.76 parts of 2-acetoacetylamino-benzoic acid were used. Main component and additional component were in a ratio of 96:4 mol percent.

At a ratio of color pigment to white pigment of 1:80, 80 parts of this modified pigment dyed a zinc oxide-linseed oil paste to the same degree as 100 parts of the comparative dyestuff 1 did. An intaglio printing ink produced with the modified pigment showed the flow value of 2,310 whereas, under the same conditions, the comparative dyestuff 1 gave a flow value of only 9,900.

EXAMPLE 6

36.70 parts of 2-acetoacetylamino-toluene as the main component and 2.12 parts of 1-acetoacetylamino-benzene-3,5-dicarboxylic acid as the additional component were dissolved as described in Example 1, and the solution was precipitated. Main component and additional component were in a ratio of 96:4 mol percent.

Coupling with a tetrazonium salt solution prepared according to Example 1 from 25.3 parts of 3,3'-dichloro-4,4'-diamino-diphenyl as well as after-treatment and work-up were also performed as in Example 1.

Comparative dyestuff 6

A comparative dyestuff was prepared according to the same process except that only 2-acetoacetyl-amino-toluene was used as a coupling component in an equivalent amount of 38.24 parts.

At a ratio of color pigment to white pigment of 1:80, 70 parts of the modified pigment dyed a zinc oxide-linseed oil paste to the same degree as 100 parts of the comparative dyestuff 6 did. A toluene intaglio printing ink produced with and containing 15% of this modified pigment showed a flow value of 36, whereas the ink prepared from the comparative dyestuff 6 had a value of 1,330.

EXAMPLE 7

Coupling was performed as in Example 6 except that 37.48 parts of 2-acetoacetylamino-toluene as the main component and 0.88 part of 2-acetoacetylamino-benzoic acid as the additional component were used. Main component and additional component were in a ratio of 98:2 mol percent.

At a ratio of color pigment to white pigment of 1:80, 70 parts of this modified pigment dyed a zinc oxide-linseed oil paste to the same degree as 100 parts of the comparative dyestuff 6 did. A toluene intaglio printing ink produced with and containing 15% of this modified pigment showed a flow value of 18 whereas the comparative dyestuff led to a flow value of 1,330. Another advantage of the intaglio printing ink produced with the modified pigment was that it suffered no loss in tinctorial strength by recrystallization during storage. When the intaglio printing inks produced with the modified pigment and with the comparative dyestuff 6 were tested for storage stability over 6 days at 50° C. it appeared that the ink obtained with the modified pigment preserved its tinctorial strength to a large extent whereas the ink prepared from the comparative dyestuff 6 showed a reduction in tinctorial strength and a dulling of the shade.

EXAMPLE 8

Coupling was performed as in Example 6 except that, instead of the additional component mentioned in Example 6, 1.90 parts of 2-hydroxy-4-acetoacetylamino-benzoic acid were used. The molar ratio being 96:4%.

At a ratio of color pigment to white pigment of 1:80, 70 parts of this modified pigment dyed a zinc oxide-linseed oil paste to the same degree as 100 parts of the comparative dyestuff 6 did.

EXAMPLE 9

38.95 parts of 2-acetoacetylamino-anisol and 2.65 parts of 2-acetoacetylamino-benzoic acid were stirred with 1,000 parts by volume of water, and the mixture was dissolved by adding 28 parts by volume of a 33% aqueous sodium hydroxide solution. After addition of 1.4 parts of a coupling auxiliary specified below the alkaline solution obtained was precipitated while rapidly stirring with about 20 parts by volume of glacial acetic acid and the pH was adjusted to 5.5. Main component and additional component were in a ratio of 94:6 mol percent. The coupling auxiliary used consisted of 75 parts of mineral oil and 25 parts of the sodium salt of an alkyl-sulfamido-acetic acid obtained by semi-sulfochlorination of a hydrocarbon fraction boiling between 220° and 230° C. and reaction with amino-acetic acid.

Coupling was performed at 20° C. with a tetrazonium salt solution prepared according to Example 1 from 25.3 parts of 3,3'-dichloro-4,4'-diamino-diphenyl. This tetrazonium salt solution was introduced beneath the surface of the intensely stirred coupling suspension in such a manner that half the portion was added within 15 minutes and the second half within further 45 minutes. At the same time, care was taken that there was never an excess of the tetrazonium salt solution in the coupling suspension. When coupling was complete, the suspension was heated to 90° C. by feeding in steam within 30 minutes, and stirring was then continued for another hour at this temperature. The suspension was cooled to 60° C. by adding cold water, suction-filtered and washed with a large amount of water on the filter. The substance was dried in a drying cabinet with circulating air at 50–60° C. After grinding a yellow pigment powder was obtained.

Comparative dyestuff 9

A comparative dyestuff was prepared according to the same process except that only 2-acetoacetylamino-anisol was used as a coupling component in an equivalent amount of 41.44 parts. A toluene intaglio printing ink produced from and containing 10% of the modified pigment had a flow value of 358, whereas the printing ink prepared from the comparative dyestuff 9 had a flow value of 4,060. At a ratio of color pigment to white pigment of 1:80, 70 parts of the modified pigment dyed a zinc oxide-linseed oil paste to the same degree as 100 parts of the comparative dyestuff 9 did.

EXAMPLE 10

Coupling was performed as in Example 9 except that, instead of 2-acetoacetylamino-anisol, 38.59 parts of 1-acetoacetylamino-2,4-dimethylbenzene were used. Main component and additional component were in a ratio of 94:6 mol percent.

Comparative dyestuff 10

A comparative dyestuff was prepared according to the same process with the exception that only 1-acetoacetyl-amino-2,4-dimethylbenzene was used as a coupling component in an equivalent amount of 41.04 parts.

For a test in an air-drying varnish 15 parts of pigment were dispersed for 30 minutes with 85 parts of a binder consisting of 20% of an oil-modified alkyd resin and 80% of white spirit in a vibration ball mill (paint shaker). The ground paste thus obtained was diluted with another binder to yield a lacquer containing 5% of pigment. This so-called full shade lacquer was used to produce lake films on white and black bottoms. Having the same shade the like films prepared with the modified pigment have a substantially higher color intensity and especially a very substantially higher transparency than the lake films obtained with the comparative dyestuff 10.

When the modified pigment was incorporated into a commercial book printing varnish on a three-roller mill, a book printing ink was obtained which provided substantially more transparent prints than the ink prepared under the same conditions from the comparative dyestuff 10.

EXAMPLE 11

32.60 parts of acetoacetylamino-benzene and 4.09 parts of 2-chloro-4-acetoacetylamino-benzoic acid were stirred in 1000 parts by volume of water, and the mixture was dissolved by adding 28 parts by volume of a 33% aqueous sodium hydroxide solution. 0.3 part of a surfactant was added to the alkaline solution, the surfactant being obtained by oxethylation of p-nonyl-phenol with 23 mols of ethylene oxide. The solution was then precipitated while rapidly stirring with about 20 parts by volume of glacial acetic acid, and the pH was adjusted to 5.5. The main component and the additional component were in a ratio of 92:8 mol percent. Coupling was performed with a tetrazonium salt solution prepared according to Example 1 from 25.3 parts of 3,3' - dichloro - 4,4' - diamino-diphenyl as indicated in Example 1.

Comparative dyestuff 11

A comparative dyestuff was prepared according to the same process except that only acetoacetylamino-benzene was used as a coupling components in an equivalent amount of 35.44 parts.

At a ratio of color pigment to white pigment of 1:20, 70 parts of this modified pigment dyed a zinc oxide-linseed oil paste to the same degree as 100 parts of the comparative dyestuff 11 did.

A toluene intaglio printing ink prepared with and containing 15% of the modified pigment showed a flow value of 20 whereas the ink obtained with the comparative dyestuff 11 had a flow value of 3700.

EXAMPLE 12

35.26 parts of acetoacetylamino-benzene were dissolved and precipitated as in Example 1. Coupling was also performed as in Example 1 with a tetrazonium salt solution prepared from 25.3 parts of 3,3' - dichloro - 4,4'-diamino-diphenyl with the exception that a solution of 0.26 part of 3-acetoacetylamino-benzene-sulfonic acid in 200 parts by volume of water was introduced at the same time as the tetrazonium salt solution but separately therefrom through a second dropping funnel within 80 minutes. The further after-treatment and the work-up were performed as in Example 1. Main component and additional component were in a ratio of 99.5:0.5 mol percent.

At a ratio of color pigment to white pigment of 1:80, 85 parts of this modified pigment dyed a zinc oxide-linseed oil paste to the same degree as 100 parts of the comparative dyestuff 1 did.

EXAMPLE 13

19.06 parts of 2-acetoacetylamino-anisol (46 mol percent), 18.88 parts of 1 - acetoacetylamino - 2,4 - dimethylbenzene (46 mol percent) and 3.54 parts of 2-acetoacetylamino - benzoic acid (8 mol percent) were stirred in 900 parts by volume of water, and the mixture was dissolved by adding 28 parts by volume of a 33% aqueous sodium hydroxide solution. After addition of 1.4 parts of the coupling auxiliary specified in Example 9, which had been previously emulsified in 100 parts by volume of water, the solution was precipitated while rapidly stirring with about 20 parts by volume of glacial acetic acid, and the pH was adjusted to 5.5. Coupling was performed at 20° C. by introducing a tetrazonium salt solution prepared according to Example 1 from 25.3 parts of 3,3' - dichloro - 4,4' - diamino - diphenyl beneath the surface of the intensely stirred coupling solution within 2 hours. After coupling the coupling liquor was heated to 90° C. by feeding in steam within 30 minutes, and stirring was continued for 30 minutes at the same temperature. Subsequently, 10 parts of 1,2-dichloro-benzene were slowly added dropwise, and stirring was continued for another hour at 90° C. After cooling to 70° C. by adding cold water the suspension was suction-filtered and the residue was washed with a large amount of water on the filter. The product was dried at 60° C. in a drying cabinet with circulating air. After grinding a yellow pigment powder was obtained.

Comparative dyestuff 13

A comparative dyestuff was prepared according to the same process with the exception that only 2-acetoacetyl-amino-anisol and 1 - acetoacetylamino - 2,4 - dimethylbenzene were used in equivalent amounts of 20.72 and 20.52 parts respectively at a ratio of 50:50 mol percent. A toluene intaglio printing ink prepared with and containing 10% of the modified pigment showed a flow value of 10 whereas the ink prepared from the comparative dyestuff had a value of 550. At a ratio of color pigment to white pigment of 1:80, 70 parts of the modified pigment dyed a zinc oxide-linseed oil paste to the same degree as 100 parts of the comparative dyestuff 13 did.

EXAMPLE 14

51.08 parts of 1 - acetoacetylamino - 2,5 - dimethoxy-4-chlorobenzene and 2.65 parts of 2-acetoacetylamino-benzoic acid were stirred in 900 parts by volume of water, and the mixture was dissolved by adding 56 parts by volume of a 33% aqueous sodium hydroxide solution. 1.0 part of a surfactant obtained by oxethylation of stearyl alcohol with 20 mols of ethylene oxide and previously dissolved in about 30 parts by volume of water was added to the alkaline solution obtained. The solution was precipitated while rapidly stirring with a dilute acetic acid previously prepared from 40 parts by volume of glacial acetic acid and 100 parts by volume of water. The pH was subsequently adjusted to 5.5 Main component and additional component were in a ratio of 94:6 mol percent.

Coupling was performed at 20° C. within 90 minutes with a tetrazonium salt solution prepared according to Example 1 from 25.3 parts of 3,3'-dichloro - 4,4' - diamino-diphenyl. The tetrazo solution was introduced beneath the surface of the intensely stirred coupling suspension in such a manner that there was never an excess thereof in the coupling liquor. After addition of ⅘ of the total amount of the tetrazo solution the coupling rate decreased appreciably. At this moment 100 parts by volume of pyridine were added to the coupling liquor and coupling was completed in usual manner. After coupling the liquor was heated to 80° C. by feeding in steam within 30 minutes, and stirring was continued for another 20 minutes at this temperature. By adding cold water the suspension was cooled to 50–60° C., suction-filtered and washed on the filter with a large amount of water. The product was dried at 50–60° C. in a drying cabinet with circulating air. After grinding a color intensive yellow pigment powder was obtained.

Comparative dyestuff 14

A comparative dyestuff was prepared according to the same process with the exception that only 1-acetoacetyl-amino - 2,5 - dimethoxy - 4 - chlorobenzene was used in an equivalent amount of 54.34 parts.

A toluene intaglio printing ink prepared with and containing 15% of the modified pigment showed a flow value of 280, whereas the printing ink produced from the comparative dyestuff 14 had a flow value of 6,700. At a ratio of color pigment to white pigment of 1:20, 85 parts of the modified pigment dyed a zinc oxide-linseed oil paste to the same degree as 100 parts of the comparative dyestuff 14 did.

EXAMPLE 15

34.42 parts of 4-acetoacetylamino-toluene and 4.42 parts of 3-acetoacetylamino-benzoic acid were stirred in 800 parts by volume of water, and the mixture was dissolved by adding 28 parts by volume of a 33% aqueous sodium hydroxide solution. 1.0 part of a surfactant obtained by oxethylation of stearyl alcohol with 20 mols of ethylene oxide and previously dissolved in about 30 parts by volume of water was then added to the alkaline solution obtained. The solution was then precipitated while rapidly stirring with about 20 parts by volume of glacial acetic acid, and the pH was adjusted to 55. The main component and the additional component were in a ratio of 90:10 mol percent.

Coupling was brought about at 20° C. over a period of about 90 minutes with a tetrazonium salt solution prepared according to Example 1 from 25.3 parts of 3,3'-dichloro-4,4'-diamino-diphenyl by introducing the tetrazo solution beneath the surface of the intensely stirred coupling suspension in such a manner that there was never an excess of tetrazo solution in the coupling liquor. When coupling was complete the liquor was heated to 90° C. by feeding in steam within 30 minutes, and stirring was continued for another hour at this temperature. By adding water the suspension was cooled to 60–70° C., then suction-filtered and washed with a large amount of water on the filter. The product was dried at 50–60° C. in a drying cabinet with circulating air. After grinding a yellow pigment powder was obtained.

Comparative dyestuff 15

A comparative dyestuff was prepared according to the same process except that only 4-acetoacetylamino-toluene was used in an equivalent amount of 38.24 parts.

For a test in an air-drying varnish a full shade lacquer having a pigment content of 5% was prepared according to Example 10. This lacquer was used to produce lake films on black and white bottoms. The lake films produced with the modified pigment had a substantially higher color intensity and transparency than the lake films obtained from the comparative dyestuff 15. For the evaluation of the tinctorial strength in the white brightening the specified full shade lacquer was brightened by means of a white varnish containing titanium dioxide at a ratio of 1:50, calculated on the color pigment and white pigment. This lacquer brightened in such a manner was used to produce lake films on a white bottom. The white brightenings obtained with the modified pigment had a substantially purer shade and, at the same time, a higher intensity. 75 to 80 parts of the modified pigment showed the same tinctorial strength as 100 parts of the comparative dyestuff 15. For the test in plasticized polyvinyl chloride 0.1% of pigment and 0.5% of titanium dioxide were dispersed by rolling (for 8 minutes at 130° C.) in a plasticized PVC mass.

Compared to that obtained with the comparative dyestuff 15, the dyeing obtained with the modified pigment had almost the same color intensity but a slightly greener shade. The substantially increased purity of shade was especially striking.

EXAMPLE 16

34.42 parts of 2-acetoacetylamino-toluene and 4.42 parts of 4-acetoacetylamino-benzoic acid were dissolved and precipitated as in Example 1. The main component and the additional component were in a ratio of 90:10 mol percent.

Coupling was performed at 20° C. by introducing a tetrazonium salt solution prepared according to Example 1 from 25.3 parts of 3,3'-dichloro-4,4'-diamino-diphenyl over the period of 90 minutes beneath the surface of an intensely stirred coupling suspension in such a manner that there was never an excess of tetrazonium salt solution in the coupling liquor. As soon as about ⅔ of the tetrazo solution had been consumed, another 50 parts by volume of 4 N sodium acetate solution were added to the coupling suspension. When coupling was complete the pigment suspension obtained was heated to 90° C. by feeding in steam within 30 minutes. At this temperature, 10 parts of 1,2-dichlorobenzene were added dropwise within 10 minutes, and stirring was continued for another hour at 90° C. After cooling to about 60° C. by addition of cold water, the suspension was suction-filtered, the substance was carefully washed with water on the filter, dried as usual and ground. A yellow pigment powder was obtained.

Comparative dyestuff 16

A comparative dyestuff was prepared according to the same process with the exception that only 2-acetoacetylamino-toluene was used as a coupling component in an equivalent amount of 38.24 parts.

At a ratio of color pigment to white pigment of 1:20, 65 parts of the modified pigment dyed a zinc oxide-linseed oil paste to the same degree as 100 parts of the comparative dyestuff 16 did. A toluene intaglio printing ink prepared with and containing 15% of the modified pigment showed a flow value of 25, whereas the printing ink produced from the comparative dyestuff 16 had a flow value of 415.

EXAMPLE 17

33.67 parts of acetoacetylamino-benzene and 2.21 parts of 2-acetoacetylamino-benzoic acid were stirred in 800 parts by volume of water and the mixture was dissolved by adding 28 parts by volume of a 33% aqueous sodium hydroxide solution. 0.8 part of a surfactant obtained by oxethylation of p-nonylphenol with 30 mols of ethylene oxide and previously dissolved in about 30 parts by volume of water was added to the alkaline solution. The solution was then precipitated while rapidly stirring with 20 parts by volume of glacial acetic acid. 5.0 parts of coco fatty acid amine acetate that had previously been dissolved in 50 parts by volume of water were added to the coupling suspension thus obtained. Subsequently the pH was adjusted to 5.5. The main component and the additional component were in a ratio of 95:5 mol percent.

Coupling was performed at 20° C. with a tetrazonium salt solution prepared according to Example 1 from 25.3 parts of 3,3'-dichloro-4,4'-diamino-diphenyl by introducing the tetrazo solution over a period of 90 minutes beneath the surface of the intensely stirred coupling suspension. The suspension was then heated to 90° C. by feeding in steam within 30 minutes, and stirring was continued for another hour at this temperature. The suspension was cooled to about 60° C. by adding cold water, suction-filtered and the substance was washed with a large amount of water on the filter. The product was dried at 50–60° C. in a drying cabinet with circulating air. After grinding a yellow pigment powder was obtained.

Comparative example 17

A comparative dyestuff was prepared according to the same process with the exception that only acetoacetylamino-benzene was used as a coupling component in an equivalent amount of 35.44 parts.

A toluene intaglio printing ink prepared with and containing 15% of such a modified pigment showed a flow value of 715, whereas an ink obtained from the comparative dyestuff 17 had a flow value of 1,675.

EXAMPLE 18

28.35 parts of acetoacetylamino-benzene (80 mol percent), 4.42 parts of 3-acetoacetylamino-benzoic acid (10 mol percent) and 4.42 parts of 4-acetoacetylamine-benzoic acid (10 mol percent) were stirred in 800 parts by volume of water, and the mixture was dissolved by adding 56 parts by volume of a 33% aqueous sodium hydroxide solution. 1.0 part of a surfactant obtained by oxethylation of stearyl alcohol with 20 mols of ethylene oxide and previously dissolved in about 30 parts by volume of water was added to the solution obtained. The solution was precipitated while rapidly stirring with about 40 parts by volume of glacial acetic acid, and the pH was adjusted to 5.5. Coupling was performed at 20° C. over a period of 90 minutes with a tetrazonium salt solution prepared according to Example 1 from 25.3 parts of 3,3'-dichloro-4,4'-diamino-diphenyl. After coupling the suspension was heated to 90° C. by feeding in steam within 30 minutes, and stirring was continued for 1 hour at this temperature. The suspension was rapidly cooled to 60° C. by adding ice and then further cooled to 25° C. Then it was mixed with calcium colophonate. After addition of 10 parts of a 20% solution of calcium chloride to the coupling liquor a solution of sodium colophonate obtained by dissolving 12 parts of 50% sodium colophonate in 200 parts by volume of water was added dropwise while vigorously stirring over a period of 30 minutes. Stirring was then continued for 30 minutes at 20–25° C., the suspension was suction-filtered, and the substance was washed on the filter with water. The product was dried at 50–60° C. in a drying cabinet with circulating air. After grinding a yellow pigment powder was obtained.

Comparative dyestuff 18

A comparative dyestuff was prepared according to the same process with the exception that only 1-acetoacetyl-aminobenzene was used as a coupling component in an equivalent amount of 35.44 parts. At a ratio of color pigment to white pigment of 1:80, 85 parts of the modified pigment dyed a zinc oxide-linseed oil paste to the same degree as 100 parts of the comparative dyestuff 18 did. A toluene intaglio printing ink prepared from and containing 15% of the modified pigment showed a flow value of 215, whereas the printing link produced from the comparative pigment had a flow value of 5,950.

EXAMPLE 19

36.13 parts of 1-(p-tolyl)-3-methyl-pyrazolone-(5) and 1.63 parts of 1 - phenyl-3-carboxy-pyrazolone-(5) were stirred in 450 parts by volume of water, and the mixture was dissolved by adding 19 parts by volume of a 33% aqueous sodium hydroxide solution. This solution was diluted was 500 parts by volume of water and 25 parts of calcium carbonate were added. The main component and the additional component were in a ratio of 96:4 mol percent.

Coupling was performed at 20° C. with a tetrazonium salt solution prepared according to Example 1 from 25.3 parts of 3,3'-dichloro-4,4'-diamino-diphenyl by introducing it within 90 minutes beneath the surface of the intensely stirred coupling suspension. When coupling was complete, the pH was adjusted to 2 by means of 5 N hydrochloric acid and the solution was heated to the boil by feeding in steam within 1 hour. The whole was stirred for 1 hour at boiling temperature and then cooled to about 60° C. by adding cold water. The dyestuff suspension was suction-filtered and the dyestuff was washed with water on the filter. The product was dried at 60° C. in a drying cabinet with circulating air. After grinding an orange-colored pigment powder was obtained.

Comparative dyestuff 19

A comparative dyestuff was prepared according to the same process except that only 1-(p-tolyl)-3-methyl-pyrazolone-(5) was used as a coupling component in an equivalent amount of 37.65 parts.

At a ratio of color pigment to white pigment of 1:20, 70 parts of the modified pigment of the invention dyed a zinc oxide-linseed oil paste to the same degree as 100 parts of the comparative dyestuff 19 did. For a test in an air-drying varnish a full-shade lacquer was prepared as in Example 10, which had a pigment content of 5%. With this lacquer lake films were produced on black and white bottoms. The lake films obtained with the modified pigment had a substantially higher color intensity and transparency than the films obtained from the comparative dyestuff 19. In a blend with a white pigment (1:50 with titanium dioxide) 80 parts of the modified pigment showed the same tinctorial strength as 100 parts of the comparative dyestuff 19. For the test in plasticized PVC 0.1% of pigment and 0.5% of titanium dioxide were dispersed by rolling (for 8 minutes at 130° C.) in a plasticized PVC mass. The coloration obtained with the modified pigment had a substantially higher intensity than the coloration obtained from the comparative dyestuff 19. 80 parts of the modified pigment showed the same tinctorial strength as 100 parts of the comparative dyestuff did.

EXAMPLE 20

34.48 parts of 1-phenyl-3-methyl-pyrazolone-(5) and 0.61 part of 1-(2'-chloro-4'-sulfophenyl)-3-methyl-pyrazolone-(5) were dissolved in 110 parts by volume of 2 N sodium hydroxide solution, the solution was diluted with 800 parts by volume of water and, after addition of 136 parts of crystallized sodium acetate, cooled to +5° C. The main component and the additional component were in a ratio of 99:1 mol percent.

The required tetrazonium salt solution was prepared according to Example 1 from 25.3 parts of 3,3'-dichloro-4,4'-diamino-diphenyl. For coupling the pyrazolone solution was introduced while intensely stirred within 5 minutes beneath the surface of the cooled tetrazo solution, the temperature being not more than +10° C. After addition of the pyrazolone solution, stirring was continued for 30 minutes at +5 to +10° C. and subsequently for 90 minutes at room temperature. The suspension was heated to 90-95° C. by feeding in steam with 15 minutes, and stirring was again continued for 15 minutes at this temperature. The suspension was cooled to about 80° C. by adding cold water, then suction-filtered and washed on the filter with a large amount of water. The product was dried at 50-60° C. in a drying cabinet with circulating air and, after grinding, an orange-colored pigment powder was obtained.

Comparative dyestuff 20

A comparative dyestuff was prepared according to the same process with the exception that only 1-(p-tolyl)-3-methylpyrazolone-(5) was used in an equivalent amount of 34.83 parts.

When the modified pigment was incorporated into an intaglio printing ink on the basis of toluene having a pigment content of 15%, the printing ink obtained showed a flow value of 350, whereas the ink prepared from the comparative dyestuff 20 had a flow value of 680.

The modified pigment was also suitable for coloring varnishes. According to the method disclosed in Example 15 for the evaluation of the tinctorial strength in the white brightening (1:50 with titanium dioxide), 80 parts of the modified pigment had the same tinctorial strength as 100 parts of the comparative dyestuff 20.

EXAMPLE 21

36.14 parts of 1-(p-tolyl)-3-methyl-pyrazolone-(5) and 1.76 parts of 2-acetoacetylamino-benzoic acid were stirred with 450 parts by volume of water, and the mixture was dissolved by adding 19 parts by volume of a 33% aqueous sodium hydroxide solution. After addition of 25 parts of calcium carbonate the solution was diluted to 1000 parts by volume with water. Main component and additional component were in a ratio of 96:4 mol percent.

Coupling was performed with a tetrazonium salt solution prepared according to Example 1 from 25.3 parts of 3,3'-dichloro-4,4'-diamino-diphenyl over a period of 90 minutes at a temperature of 20° C. When coupling was complete the pH was adjusted to 2.0 by adding an adequate amount of 5 N hydrochloric acid. The suspension was then heated to the boil by feeding in steam within 1 hour, and stirring was continued for another hour at this temperature. The pigment suspension was cooled to 60° C. by adding cold water and washed on the filter with a large amount of water. The product was dried at 50–60° C. in a drying cabinet with circulating air. After grinding an orange-colored pigment powder was obtained.

Comparative dyestuff 21

A comparative dyestuff was prepared according to the same process except that, instead of 2-acetoacetylamino-benzoic acid, 1.42 parts of acetoacetylamino-benzene (4 mol percent) were used.

At a ratio of color pigment to white pigment of 1:20, 85 parts of the modified pigment dyed a zinc oxide-linseed oil paste to the same degree as 100 parts of the comparative dyestuff 21 did.

EXAMPLE 22

Coupling was performed as in Example 21 except that, instead of 2-acetoacetylamino-benzoic acid, 1.76 parts of 3-acetoacetylamino-benzoic acid were used. The main component and the additive component were in a ratio of 96:4 mol percent.

At a ratio of color pigment to white pigment of 1:20, 85 parts of the modified pgiment dyed a zinc oxide-linseed oil paste to the same degree as 100 parts of the comparative dyestuff 21 did.

We claim:
1. A mixture of disazo dyestuffs consisting of
(a) 1 or 2 non-polar symmetrical dyestuffs of the formula

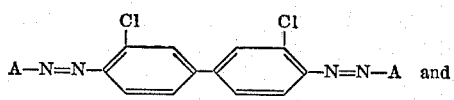

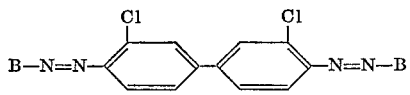

(b) 0 or 1 non-polar asymmetrical dyestuff of the formula

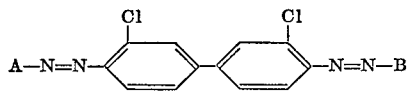

(c) 1 or 2 polar symmetrical dyestuffs of the formula

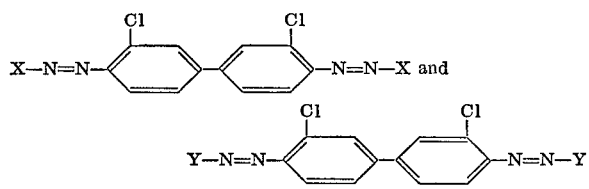

and (d) 1, 2, 3 or 5 polar asymmetrical dyestuffs of the formula

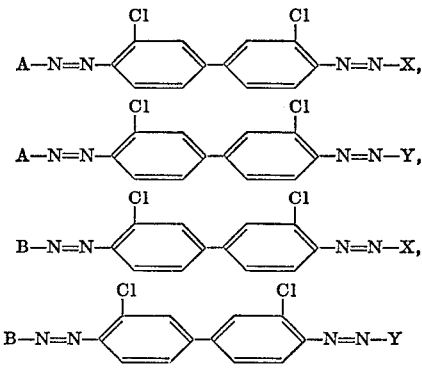

and

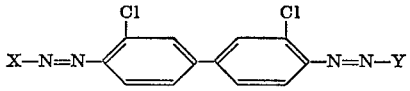

wherein A and B each is acetoacetylaminobenzene or acetoacetylaminobenzene substituted by 1 to 3 of the groups lower alkyl, lower alkoxy, chlorine, bromine, 1-arylpyrazolone-(5) and 1-aryl-pyrazolone-(5) substitued at the 3-postiion by lower alkyl or lower alkoxy and on the aryl ring by 1 to 3 of the groups lower alkyl, lower alkoxy, chlorine and bromine, provided that A and B are different, X is A and Y is B provided that X and Y each is substituted by 1 or 2 of the groups consisting of —COOH and —SO$_3$H, said dyestuffs being present in an amount of about 99.5 to about 80 mol percent based on the amount of A, B or A and B in a molar ratio of about 80:20 to about 20:80, and in an amount of about 0.5 to about 20 mol percent based on the amount of X, Y or X and Y in a molar ratio of about 90:10 to about 10:90.

2. A mixture according to claim 1 wherein said amount of A, B or A and B is about 99 to about 95 mol percent and said amount of X, Y or X and Y is about 1 to about 5 mol percent.

3. A mixture according to claim 1 wherein said molar ratio of A and B is about 50:50 and said molar ratio of X and Y is about 50:50.

4. A mixture according to claim 2 wherein said molar ratio of A and B is about 50:50 and said molar ratio of X and Y is about 50:50.

References Cited
UNITED STATES PATENTS

| | | | |
|---|---|---|---|
| 3,529,984 | 9/1970 | Bandel et al. | 106—288 Q |
| 3,533,818 | 10/1970 | Bandel et al. | 106—288 Q |
| 3,617,171 | 11/1971 | Ribka | 8—26 |
| 3,218,311 | 11/1965 | Forter et al. | 8—26 X |
| 2,361,567 | 10/1944 | Reynolds | 260—176 |
| 3,567,707 | 3/1971 | Neave et al. | 260—161 |
| 2,034,668 | 3/1936 | Reindel et al. | 260—161 X |
| 3,366,619 | 1/1968 | De Lucia et al. | 260—161 |

GEORGE F. LESMES, Primary Examiner
P. C. IVES, Assistant Examiner

U.S. Cl. X.R.

8—4; 106—289, 22, 27, 32; 260—176, 41, 161, 37